United States Patent [19]

Green et al.

[11] Patent Number: 5,203,916
[45] Date of Patent: Apr. 20, 1993

[54] TITANIUM DIOXIDE PIGMENT AND METHOD OF PREPARATION

[75] Inventors: Kelly A. Green, Edmond; Thomas I. Brownbridge, Oklahoma City, both of Okla.

[73] Assignee: Kerr-McGee Chemical Corporation, Oklahoma City, Okla.

[21] Appl. No.: 866,705

[22] Filed: Apr. 10, 1992

[51] Int. Cl.$^5$ .............................................. C04B 1/00
[52] U.S. Cl. ...................................... 106/438; 106/442
[58] Field of Search .......................... 106/438, 442

[56] References Cited

U.S. PATENT DOCUMENTS

| | | | |
|---|---|---|---|
| 3,770,470 | 11/1973 | Suank | 106/442 |
| 3,859,109 | 1/1975 | Wiseman et al. | 106/300 |
| 4,052,222 | 10/1977 | Howard | 106/300 |
| 4,052,223 | 10/1977 | Howard | 106/300 |
| 4,052,224 | 10/1977 | Howard | 106/300 |
| 4,179,306 | 12/1979 | Woditsch et al. | 106/300 |
| 4,328,040 | 5/1982 | Panek et al. | 106/300 |
| 4,374,675 | 2/1983 | Scotti et al. | 106/300 |
| 4,375,989 | 3/1983 | Makimen | 106/300 |
| 4,405,376 | 9/1983 | Matsunaga et al. | 106/300 |
| 4,447,270 | 5/1984 | Howard et al. | 106/300 |
| 4,447,271 | 5/1984 | Howard et al. | 106/300 |
| 4,450,012 | 5/1984 | Messer et al. | 106/300 |

FOREIGN PATENT DOCUMENTS 990457 6/1976 Canada .

OTHER PUBLICATIONS

World Patents Index Abstract Nos. EP 8101 dated Jan. 20, 1980, BE 845134 dated Feb. 14, 1977, DE 2629954 dated Feb. 3, 1977, DE 2629953 dated Feb. 3, 1977, JP 50034031 dated Apr. 2, 1975, GB 1368601 dated Oct. 2, 1974, GB 1365999 dated Sep. 4, 1974, DE 2223524 (date unknown), DE 2313544 (date unknown), DE 2313542 (date unknown), GB 1330157 (date unknown), BE 786202 (date unknown), DE 2216857 (date unknown), NL 7002815 (date unknown), NL 7002814 (date unknown), GB 1192788 (date unknown), BE 868607 dated Jan. 2, 1979.

World Patents Index Abstract Nos. JP 53040022 dated Apr. 12, 1978, CA 990457 dated Jun. 8, 1976, FR 2045426 (date unknown), JP 70020590 (date unknown), CA 845657 (date unknown), JP 3050120 dated Mar. 4, 1991, JP 3023221 dated Jan. 31, 1991, EP 406194 dated Jan. 2, 1991, JP 2194063 dated Jul. 31, 1990, GB 2226018 dated Jun. 20, 1990, JP 1264932 dated Oct. 23, 1989, JP 62185761 dated Aug. 14, 1987, JP 61295234 dated Dec. 26, 1986, JP 61281018 dated Dec. 11, 1986, JP 60245671 dated Dec. 5, 1985, GB 2108098 dated May 11, 1983.

World Patents Index Abstract Nos. EP 78632 dated May 6, 1983, GB 2108097 dated May 11, 1983, B 2088348 dated Jun. 9, 1982, EP 44515 dated Jan. 27, 1982, EP 32426 dated Jul. 22, 1981, EP 32425 dated Jul. 22, 1981, EP 254861 dated Feb. 3, 1988, EP 75197 dated Mar. 30, 1983.

Primary Examiner—Mark L. Bell
Assistant Examiner—Chris Gallo
Attorney, Agent, or Firm—Herbert M. Hanegan

[57] ABSTRACT

The present invention provides a pigmentary titanium composite having good durability and excellent optical properties. The inventive composite consists essentially of: a particulate titanium dioxide base; a hydrous zirconium oxide layer deposited on the titanium dioxide base; and a hydrous alumina layer deposited on the hydrous zirconium oxide layer. The alumina layer consists essentially of boehmite alumina and/or pseudoboehmite alumina.

The present invention also provides a method for preparing the inventive pigmentary composite. The inventive method comprises the steps of: (a) preparing an aqueous slurry comprising water and a particulate titanium dioxide base; (b) depositing a layer of a hydrous zirconium oxide precipitate on the titanium dioxide base; and (c) depositing a layer of a hydrous alumina precipitate on the layer of hydrous zirconium oxide. The hydrous alumina precipitate consists essentially of boehmite alumina and/or pseudoboehmite alumina.

36 Claims, No Drawings

TITANIUM DIOXIDE PIGMENT AND METHOD OF PREPARATION

FIELD OF THE INVENTION

In one aspect, the present invention relates to pigmentary titanium dioxide composites In another aspect, the present invention relates to methods of preparing pigmentary titanium dioxide composites.

BACKGROUND OF THE INVENTION

Pigmentary titanium dioxide is widely used as a coloring agent in a number of applications. For example, pigmentary titanium dioxide is commonly used as a coloring agent in paints, plastics, inks, and papers. In most of these applications, the pigmentary titanium dioxide must exhibit both good durability and good optical properties.

SUMMARY OF THE INVENTION

The present invention provides a novel pigmentary titanium dioxide composite which exhibits both (a) good durability and (b) excellent optical properties. Consequently, the inventive pigmentary composite can be used in a wide range of applications. For example, the inventive pigmentary titanium dioxide composite can be used as a coloring agent in paints, plastics, inks, and papers.

In one aspect, the present invention provides a pigmentary composite consisting essentially of: a particulate titanium dioxide base; a hydrous zirconium oxide layer deposited on the titanium dioxide base; and a hydrous alumina layer deposited on the hydrous zirconium oxide layer. The alumina layer consists essentially of boehmite alumina, pseudoboehmite alumina, or a combination thereof.

The present invention also provides a method of preparing a pigmentary titanium dioxide composite comprising the steps of: (a) preparing an aqueous slurry comprising water and a particulate titanium dioxide base; (b) depositing a layer of a hydrous zirconium oxide precipitate on the titanium dioxide base; and (c) depositing a layer of a hydrous alumina precipitate on said layer of hydrous zirconium oxide. The hydrous alumina precipitate consists essentially of boehmite, pseudoboehmite, or a combination thereof.

The present invention further provides a method of preparing a pigmentary titanium dioxide composite consisting essentially of the steps of: (a) dispersing a particulate titanium dioxide base in water to form an aqueous titanium dioxide slurry; (b) adding a water soluble zirconium compound to the slurry which is hydrolyzable to form a hydrous zirconium oxide precipitate; (c) forming a layer consisting essentially of hydrous zirconium oxide on the titanium dioxide base by allowing the hydrous zirconium oxide precipitate to deposit on the titanium dioxide base while maintaining the pH of the slurry in the range of from about 7 to about 9; (d) after step (c), adding a water soluble aluminum compound to the slurry which is hydrolyzable to form a hydrous alumina precipitate; (e) forming a layer consisting essentially of hydrous alumina on the layer of hydrous zirconium oxide by allowing the hydrous alumina precipitate to deposit on the layer of hydrous zirconium oxide; (f) during steps (d) and (e), maintaining the pH of the slurry in the range of from about 7 to about 9 and the temperature of the slurry in the range of from about 115° F. to about 122° F.; and (g) recovering the pigmentary composite from the slurry Other objects, features, and advantages of the present invention will be readily apparent to those skilled in the art upon reading the following Description of the Preferred Embodiments.

DESCRIPTION OF PREFERRED EMBODIMENTS

The particulate titanium dioxide base material used in the present invention is preferably a rutile titanium dioxide prepared by either the well-known chloride process or the well-known sulfate process. Such rutile titanium dioxide materials will commonly contain up to about 0.5% alumina. Alumina producing additives are commonly used in titanium dioxide production processes in order to obtain improved product durability and rutilization.

The particulate titanium dioxide base material used in the present invention preferably has a particle size of less than about 0.5 microns. The particulate titanium dioxide base most preferably has a particle size in the range of from about 0.2 to about 0.25 microns.

The hydrous zirconium oxide layer of the inventive pigmentary composite is deposited on the titanium dioxide base material in an amount sufficient to improve the durability of the inventive pigmentary composite. The hydrous zirconium oxide layer is preferably deposited on the titanium dioxide base in an amount, expressed as $ZrO_2$, in the range of from about 0.1% to about 2.5% by weight based on the weight of the titanium dioxide base. The durability of the inventive pigmentary composite is typically not substantially improved when a lesser amount of hydrous zirconium oxide is deposited on the titanium dioxide base material However, the deposition of hydrous zirconium oxide on the titanium dioxide base material in an amount exceeding about 2.5% by weight has a deleterious effect on the optical properties of the pigmentary composite.

A particularly desirably combination of durability and optical properties is obtained when the hydrous zirconium oxide layer is deposited on the titanium dioxide base material in an amount, expressed as $ZrO_2$, in the range of from about 0.4% to about 0.6% by weight based on the weight of the titanium dioxide base. Most preferably, the hydrous zirconium oxide layer is deposited on the titanium dioxide base in an amount, expressed as $ZrO_2$, of about 0.5% by weight based on the weight of the titanium dioxide base.

As indicated above, the hydrous alumina layer of the inventive pigmentary composite consists essentially of boehmite alumina, pseudoboehmite alumina, or a combination thereof. When used herein and in the claims, the term "consisting essentially of" operates to exclude the presence of additional items (i.e., additional composite layers, additional method steps, or amounts of additional compounds) which would materially alter the durability and/or optical properties of the inventive pigmentary composite.

The hydrous alumina layer operates to improve the optical properties of the inventive composite. In this regard, it is noted that the optical properties obtained using boehmite and/or pseudoboehmite alumina are superior to the optical properties obtained using gibbsite alumina or amorphous alumina. The hydrous alumina layer of the inventive composite also operates to improve both the dispersibility and the durability of the inventive composite.

The hydrous alumina layer of the inventive composite is deposited on the composite's hydrous zirconium oxide layer in an amount sufficient to improve the optical properties of the inventive pigmentary composite. The hydrous alumina layer is preferably deposited on the hydrous zirconium oxide layer in an amount, expressed as $Al_2O_3$, in the range of from about 3% to about 5% by weight based on the weight of the titanium dioxide base material. More preferably, the hydrous alumina layer is deposited on the hydrous zirconium oxide layer in an amount, expressed as $Al_2O_3$, in the range of from about 3.5% to about 4.0% by weight based on the weight of the titanium dioxide base material. Most preferably, the hydrous alumina layer is deposited on the hydrous zirconium oxide layer in an amount, expressed as $Al_2O_3$, of about 3.7% by weight based on the weight of the titanium dioxide base material.

The inventive pigmentary composite is prepared by first dispersing the particulate titanium dioxide base material in water to form an aqueous titanium dioxide slurry. The amount of the titanium dioxide base material used in preparing the slurry is preferably an amount such that the slurry has a specific gravity in the range of from about 1.2 to about 1.4. A dispersant such as sodium hexametaphosphate can optionally be used to improve the dispersion of the particulate titanium dioxide base material in the aqueous slurry medium. If used, sodium hexametaphosphate is preferably added to the aqueous slurry in an amount in the range of from about 0.05% to about 0.25% by weight based on the weight of the titanium dioxide base. More preferably, sodium hexametaphosphate is added to the slurry in an amount in the range of from about 0.1% to about 0.14% by weight based on the weight of the titanium dioxide base.

If desired or necessary, the titanium dioxide base material can be added to at least a portion of the aqueous slurry medium and then wet-milled (e.g., sand-milled) in order to reduce the particle size of the titanium dioxide base material. After the milling procedure, the slurry is screened in order to remove grit and sand.

Following preparation, the pH of the titanium dioxide slurry is preferably adjusted to a value in the range of from about 4 to about 6 using, as necessary, either an acidic pH controlling agent or a basic pH controlling agent. The pH of the titanium dioxide slurry is preferably adjusted to a value in the range of from about 4.7 to about 5.3. Examples of acidic pH controlling agents suitable for use in the present invention include mineral acids such as sulfuric acid and hydrochloric acid. The acidic pH controlling agent preferred for use in the present invention is sulfuric acid. Examples of basic pH controlling agents suitable for use in the present invention include hydroxides and carbonates of alkali metals and of alkaline-earth metals. The basic pH controlling agent preferred for use in the present invention is sodium hydroxide.

After the pH of the titanium dioxide slurry is adjusted in the manner just described, a hydrous zirconium oxide precipitate layer is deposited on the titanium dioxide base material. The hydrous zirconium oxide precipitate layer is deposited on the titanium dioxide base by (1) adding at least one water soluble zirconium compound (preferably an acidic zirconium salt) to the titanium dioxide slurry which is hydrolyzable to form a hydrous zirconium oxide precipitate, (2) adding a sufficient amount of a basic pH controlling agent to the titanium dioxide slurry to cause the formation of the hydrous zirconium oxide precipitate, and then (3) allowing the hydrous zirconium oxide precipitate to deposit on the titanium dioxide base material. In step (2) of this zirconium deposition process, the pH of the titanium dioxide slurry is preferably adjusted to a value in the range of from about 7 to about 9. The pH of the titanium dioxide slurry is then preferably maintained in the range of from about 7 to about 9 throughout the remainder of the zirconium deposition process.

The titanium dioxide slurry is also preferably stirred or agitated during the zirconium deposition process. Further, step (3) of the zirconium deposition process is preferably continued for a time period (typically at least about 15 minutes) sufficient to allow substantially all of the zirconium added to the titanium dioxide slurry to precipitate onto the titanium dioxide base material.

As indicated above, the zirconium compound used in the inventive method is preferably a water soluble acidic zirconium salt. The water soluble zirconium compound is preferably added to the titanium dioxide slurry in aqueous solution form. Examples of zirconium compounds suitable for use in the inventive method include zirconium sulfate, zirconium chloride, zirconium nitrate, zirconium acetate, zirconium carbonate, zirconium oxychloride, zirconium oxysulfate, and ammonium zirconyl carbonate. The water soluble zirconium compound preferred for use in the inventive method is zirconium sulfate.

During the zirconium deposition process, the titanium dioxide slurry is also preferably maintained at an elevated temperature not exceeding about 130° F. The use of an elevated temperature operates to speed the zirconium deposition process. However, subjecting the titanium dioxide slurry to temperatures exceeding about 130° F. will detrimentally affect the durability of the pigmentary titanium dioxide composite product. Most preferably, the titanium dioxide slurry is maintained at a temperature in the range of from about 115° F. to about 122° F. during the zirconium deposition process.

The water soluble zirconium compound used in the present invention is added to the titanium dioxide slurry in an amount such that, during the zirconium deposition process, a sufficient amount of hydrous zirconium oxide precipitate is deposited on the titanium dioxide base material to improve the durability of the inventive pigmentary composite. The water soluble zirconium compound is preferably added to the titanium dioxide slurry in an amount such that hydrous zirconium oxide precipitate is deposited on the titanium dioxide base in an amount, expressed as $ZrO_2$, in the range of from about 0.1% to about 2.5% by weight based on the weight of the titanium dioxide base. More preferably, the zirconium compound is added to the titanium dioxide slurry in an amount such that hydrous zirconium oxide precipitate is deposited on the titanium dioxide base in an amount, expressed as $ZrO_2$, in the range of from about 0.4% to about 0.6% by weight based on the weight of the titanium dioxide base. Most preferably, the zirconium compound is added to the titanium dioxide slurry in an amount such that hydrous zirconium oxide precipitate is deposited on the titanium dioxide base in an amount, expressed as $ZrO_2$, of about 0.5% by weight based on the weight of the titanium dioxide base.

After substantially all of the zirconium added to the titanium dioxide slurry has precipitated from solution and has deposited on the titanium dioxide base material, the pH of the titanium dioxide slurry is preferably maintained at or, if necessary, adjusted to a value in the range of from about 7 to about 9. During this step, the pH of the titanium dioxide slurry is most preferably maintained at, or adjusted to, a value in the range of from about 7.5 to about 8.5.

Next, a layer of hydrous alumina precipitate is deposited on the above-described hydrous zirconium oxide precipitate layer The hydrous alumina precipitate layer preferably consists essentially of boehmite, pseudoboehmite, and/or a combination thereof. The hydrous alumina precipitate layer is deposited on the hydrous zirconium oxide layer by (1) adding a water soluble aluminum compound to the titanium dioxide slurry which is hydrolyzable to form the hydrous alumina precipitate and (2) allowing the hydrous alumina precipitate to deposit on the hydrous zirconium oxide layer. Throughout steps (1) and (2) of the alumina deposition process, the titanium dioxide slurry is preferably stirred or agitated. Step (2) of the alumina deposition process is preferably continued until substantially all of the aluminum added to the titanium dioxide slurry precipitates from solution and deposits on the titanium dioxide base material.

Examples of water soluble aluminum compounds suitable for use in the inventive method include: aluminum salts of mineral acids (e.g., aluminum sulfate, aluminum nitrate, and aluminum chloride) and alkali metal aluminates (e.g., sodium aluminate). The water soluble aluminum compound preferred for use in the inventive method is sodium aluminate.

The water soluble aluminum compound used in the present invention is preferably added to the titanium dioxide slurry in aqueous solution form.

During the alumina deposition process, the pH and temperature of the titanium dioxide slurry are maintained such that the hydrous alumina precipitate deposited on the titanium dioxide base consists essentially of boehmite and/or pseudoboehmite. If the temperature of the titanium dioxide slurry is maintained at 104° F., for example, the pH of the slurry must be maintained in the range of from 8 to 10 in order to ensure that the alumina precipitate consists essentially of boehmite and/or pseudoboehmite. If the temperature of the titanium dioxide slurry is maintained at 122° F., on the other hand, the pH of the slurry must be maintained in the range of from 6 to 10 in order to ensure that the alumina precipitate consists essentially of boehmite and/or pseudoboehmite. If the pH of the titanium dioxide slurry exceeds 10 during the alumina deposition process, the hydrous alumina precipitate will consist of gibbsite alumina. If lower temperatures and pHs are used, an amorphous alumina precipitate will be formed.

During both the aluminum compound addition stage and the alumina deposition stage of the alumina deposition process, the titanium dioxide slurry is preferably maintained at a pH in the range of from about 7 to about 9 and at a temperature in the range of from about 115° F. to about 122° F. The titanium dioxide slurry is most preferably maintained at a pH in the range of from about 7.5 to about 8.5 throughout the alumina deposition process.

The water soluble aluminum compound used in the inventive method is added to the titanium dioxide slurry in an amount such that hydrous alumina precipitate is deposited on the above-described hydrous zirconium oxide layer in an amount sufficient to improve the optical properties of the inventive pigmentary composite. Preferably, a sufficient amount of the water soluble aluminum compound is added to the titanium dioxide slurry to deposit hydrous alumina precipitate on the hydrous zirconium oxide layer in an amount, expressed as $Al_2O_3$, in the range of from about 3% to about 5% by weight based on the weight of the titanium dioxide base material. More preferably, a sufficient amount of the water soluble aluminum compound is added to the titanium dioxide slurry to deposit hydrous alumina precipitate on the hydrous zirconium oxide layer in an amount, expressed as $Al_2O_3$, in the range of from about 3.5% to about 4.0% by weight based on the weight of the titanium dioxide base material. Most preferably, a sufficient amount of the aluminum compound is added to the titanium dioxide slurry to deposit hydrous alumina precipitate on the zirconium oxide layer in an amount, expressed as $Al_2O_3$, of about 3.7% by weight based on the weight of the titanium dioxide base.

After the completion of the alumina deposition process, the pH of the titanium dioxide slurry is preferably lowered to a final value of about 5 using an acidic pH controlling agent of the type described hereinabove. Lowering the final pH of the titanium dioxide slurry in this manner causes the inventive product to flocculate to a greater degree and thereby improves the processability of the product.

The novel pigmentary composite product produced by the inventive method is recovered from the titanium dioxide slurry using conventional filtering, washing, and drying procedures. The inventive pigmentary composite product is preferably washed in water and dried at a temperature of about 110° C. The dried product is preferably milled (e.g., in a fluid energy mill) prior to use.

The following example is presented in order to further illustrate the present invention.

EXAMPLE

Particulate rutile titanium dioxide (referred to in the remainder of this example as the titanium dioxide base) was dispersed in water to form an aqueous slurry having a density of 1.4 grams per milliliter. To facilitate the dispersion of the titanium dioxide base in the aqueous medium, a dispersing agent (i.e., sodium hexametaphosphate) was added to the slurry in an amount of 0.12% by weight based on the weight of the titanium dioxide base.

The titanium dioxide slurry was sand-milled for eight minutes using 1040 mesh sand. After sand-milling, the slurry was passed through a 325 mesh screen in order to remove the sand particles from the slurry. The titanium dioxide slurry was then further diluted with water such that the diluted slurry had a titanium dioxide concentration of 850 grams per liter. The density of the diluted slurry was 1.33 grams per liter. Due primarily to the presence of the sodium hexametaphosphate dispersing agent, the initial pH of the slurry was 9.9.

2,500 milliliters of the titanium dioxide slurry were then placed in a heated, stirred vessel wherein the temperature of the slurry was raised to 117° F. A sufficient amount of an aqueous sulfuric acid solution was added to the slurry to lower the pH of the slurry to a value of about 5. The aqueous sulfuric acid solution had a sulfuric acid concentration of 92% by weight.

Next, 23 milliliters of an aqueous zirconium sulfate solution were added to the titanium dioxide slurry. The zirconium sulfate solution had a zirconium sulfate concentration (expressed as $ZrO_2$) of 200 grams per liter.

Following the addition of the aqueous zirconium sulfate solution, the pH of the slurry was raised to a value of about 8 using an aqueous sodium hydroxide solution. The aqueous sodium hydroxide solution had a NaOH concentration of 20% by weight.

Next, the titanium dioxide slurry was allowed to digest in the heated, stirred vessel for 15 minutes. During this digestion stage, substantially all of the zirconium added to the titanium dioxide slurry precipitated from solution and formed a hydrous zirconium oxide layer on the particulate titanium dioxide base material. The amount of hydrous zirconium oxide deposited on the titanium dioxide base material was about 0.5% by weight, expressed as $ZrO_2$, based on the weight of the titanium dioxide base material.

After the completion of the zirconium digestion stage, an additional amount of the 20% by weight NaOH solution was added to the titanium dioxide slurry in order to maintain the pH of the titanium dioxide slurry at a value of about 8.

Next, 120 milliliters of an aqueous sodium aluminate solution were added to the titanium dioxide slurry. The aqueous sodium aluminate solution had a sodium aluminate concentration (expressed as $Al_2O_3$) of 280 grams per liter. Throughout the sodium aluminate addition stage, sufficient amounts of the above-described 94% sulfuric acid solution were added to the titanium dioxide slurry to maintain the pH of the slurry in the range of from 7.5 to 8.5. Immediately following the sodium aluminate addition stage, a sufficient amount of the 92% by weight sulfuric acid solution was added to the titanium dioxide slurry to adjust the pH of the titanium dioxide slurry to a value of about 8.

Following the sodium aluminate addition and pH adjustment stages just described, the titanium dioxide slurry was allowed to digest in the stirred, heated vessel for three hours. During this three hour digestion period, substantially all of the aluminum added to the titanium dioxide slurry precipitated from solution and formed a hydrous alumina layer on the zirconium oxide layer of the pigmentary composite. The amount of hydrous alumina deposited on the hydrous zirconium oxide layer was about 4.0% by weight (expressed as $Al_2O_3$) based on the weight of the titanium dioxide base material.

Throughout the sodium aluminate addition and digestion stages, the titanium dioxide slurry was maintained at a temperature of 117° F.

After the sodium aluminate digestion stage, the pigmentary titanium dioxide composite product was recovered from the titanium dioxide slurry by filtering. The composite product was then washed with water and dried at 110° C. Prior to testing, the composite product was milled in a fluid energy mill.

The inventive pigmentary composite was tested in order to evaluate its optical properties and durability. For comparison purposes, a known enamel grade titanium dioxide composite having excellent optical properties (CR-800 manufactured by Kerr-McGee Chemical Corp.) and a known intermediate durability grade titanium dioxide composite (CR-821 manufactured by Kerr-McGee Chemical Corp.) were also evaluated using the same test procedures. The results of these tests are presented in Table I.

TABLE I

|  | Inventive Pigmentary Composite | Enamel Grade Pigmentary Composite[1] | Intermediate Durability Grade Pigmentary Composite[2] |
| --- | --- | --- | --- |
| Scatter | 6.16 | 6.09 | 5.91 |
| Gloss | 59 | 57 | 51 |
| Brightness | 95.66 | 95.53 | 95.33 |
| Color | 0.45 | 0.53 | 0.57 |
| HSPCA[3] | 11 | >20 | 10 |

[1]CR-800 manufactured by Kerr-McGee Chemical Corp.
[2]CR-821 manufactured by Kerr-McGee Chemical Corp.
[3]High sensitivity photo catalytic activity As indicated in Table I, the inventive pigmentary composite exhibited optical properties superior to those of the enamel grade composite. Specifically, the scatter, gloss, brightness, and color properties of the inventive pigmentary composite were all superior to the corresponding optical properties of the enamel grade composite.

The inventive pigmentary composite also exhibited good durability. As indicated by the HSPCA (high sensitivity photo catalytic activity) numbers of the three pigmentary composites, the durability exhibited by the inventive pigmentary composite was roughly equivalent to the durability exhibited by the known intermediate durability grade composite. Further, the durability of the inventive pigmentary composite greatly exceeded the durability of the enamel grade composite.

Thus, the present invention is well adapted to carry out the objects and obtain the ends and advantages mentioned above as well as those inherent therein. While numerous changes may be made by those skilled in the art, such changes are encompassed within the scope of the invention as defined by the appended claims.

We claim:
1. A pigmentary composite consisting essentially of:
   a particulate titanium dioxide base;
   a hydrous zirconium oxide layer deposited on said titanium dioxide base; and
   a hydrous alumina layer deposited on said hydrous zirconium oxide layer, said alumina layer consisting essentially of boehmite alumina, pseudoboehmite alumina, or a combination thereof.
2. A pigmentary composite as described in claim 1 wherein said hydrous zirconium oxide layer is deposited on said titanium dioxide base in an amount sufficient to improve the durability of said pigmentary composite.
3. A pigmentary composite as described in claim 2 wherein said hydrous alumina layer is deposited on said hydrous zirconium oxide layer in an amount sufficient to improve the optical properties of said pigmentary composite.
4. A pigmentary composite as described in claim 1 wherein said titanium dioxide base is a rutile titanium dioxide base.
5. A pigmentary composite as described in claim 4 wherein said hydrous zirconium oxide layer is present on said titanium dioxide base in an amount, expressed as $ZrO_2$, in the range of from about 0.1% to about 2.5% by weight based on the weight of said titanium dioxide base.
6. A pigmentary composite as described in claim 5 wherein said hydrous alumina layer is present on said hydrous zirconium oxide layer in an amount, expressed as $Al_2O_3$, in the range of from about 3.5% to about

4.0% by weight based on the weight of said titanium dioxide base.

7. A pigmentary composite as described in claim 6 wherein said hydrous zirconium oxide layer is present on said titanium dioxide base in an amount, expressed as $ZrO_2$, in the range of from about 0.4% to about 0.6% by weight based on the weight of said titanium dioxide base.

8. A pigmentary composite as described in claim 7 wherein said hydrous zirconium oxide layer is present on said titanium dioxide base in an amount, expressed as $ZrO_2$, of about 0.5% by weight based on the weight of said titanium dioxide base.

9. A pigmentary composite as described in claim 7 wherein said hydrous alumina layer is present on said hydrous zirconium oxide layer in an amount, expressed as $Al_2O_3$, of about 3.7% by weight based on the weight of said titanium dioxide base.

10. A method of preparing a pigmentary composite comprising the steps of:
   (a) preparing an aqueous slurry comprising water and a particulate titanium dioxide base;
   (b) depositing a layer of a hydrous zirconium oxide precipitate on said titanium dioxide base; and
   (c) depositing a layer of a hydrous alumina precipitate on said layer of hydrous zirconium oxide precipitate, said hydrous alumina precipitate consisting essentially of boehmite alumina, pseudoboehmite alumina, or a combination thereof 11. A method as described in claim 10 wherein step (c) further comprises the steps of:
   (1) adding a water soluble aluminum compound to said slurry which is hydrolyzable to form said hydrous alumina precipitate;
   (2) maintaining the pH of said slurry during step (c) in the range of from about 7 to about 9; and
   (3) maintaining the temperature of said slurry during step (c) in the range of from about 115° F. to about 122° F.

12. A method as described in claim 11 wherein said aluminum compound is added to said slurry in step (c) in an amount such that said layer of hydrous alumina precipitate is deposited on said layer of hydrous zirconium oxide precipitate in step (c) in an amount, expressed as $Al_2O_3$, in the range of from about 3.5% to about 4.0% by weight based on the weight of said titanium dioxide base.

13. A method as described in claim 11 wherein said aluminum compound is sodium aluminate.

14. A method as described in claim 11 wherein, during step (c), the pH of said slurry is maintained in the range of from about 7.5 to about 8.5.

15. A method as described in claim 11 wherein step (b) further comprises the step of adding a water soluble zirconium compound to said slurry which is hydrolyzable to form said hydrous zirconium oxide precipitate.

16. A method as described in claim 15 wherein said zirconium compound is added to said slurry in step (b) in an amount such that said layer of hydrous zirconium oxide precipitate is deposited on said titanium dioxide base in step (b) in an amount, expressed as $ZrO_2$, in the range of from about 0.1% to about 2.5% by weight based on the weight of said titanium dioxide base.

17. A method as described in claim 15 wherein said zirconium compound is added to said slurry in step (b) in an amount such that said layer of hydrous zirconium oxide precipitate is deposited on said titanium dioxide base in step (b) in an amount, expressed as $ZrO_2$, in the range of from about 0.4% to about 0.6% by weight based on the weight of said titanium dioxide base.

18. A method as described in claim 15 wherein step (b) further comprises the step, following said step of adding said water soluble zirconium compound to said slurry, of adjusting the pH of said slurry in order to cause the formation of said hydrous zirconium oxide precipitate.

19. A method as described in claim 18 wherein said zirconium compound is zirconium sulfate.

20. A method as described in claim 19 wherein, in said step of adjusting in step (b), the pH of said slurry is adjusted to a value in the range of from about 7 to about 9.

21. A method as described in claim 19 wherein, in said step of adjusting in step (b), the pH of said slurry is adjusted to a value in the range of from about 7.5 to about 8.5.

22. A method as described in claim 11 further comprising the step, after step (c), of adjusting the pH of said slurry to a value of about 5.

23. A method of preparing a pigmentary composite consisting essentially of the steps of:
   (a) dispersing a particulate titanium dioxide base in water to form an aqueous titanium dioxide slurry;
   (b) adding a water soluble zirconium compound to said slurry which is hydrolyzable to form a hydrous zirconium oxide precipitate;
   (c) forming a layer consisting essentially of hydrous zirconium oxide on said titanium dioxide base by allowing said hydrous zirconium oxide precipitate to deposit on said titanium dioxide base while maintaining the pH of said slurry in the range of from about 7 to about 9;
   (d) after step (c), adding a water soluble aluminum compound to said slurry which is hydrolyzable to form a hydrous alumina precipitate;
   (e) forming a layer consisting essentially of hydrous alumina on said layer of hydrous zirconium oxide by allowing said hydrous alumina precipitate to deposit on said layer of hydrous zirconium oxide;
   (f) during steps (d) and (e), maintaining the pH of said slurry in the range of from about 7 to about 9 and the temperature of said slurry in the range of from about 115° F. to about 122° F.; and
   (g) recovering said pigmentary composite from said slurry.

24. A method as described in claim 23 wherein: said aluminum compound is sodium aluminate and the pH of said slurry is maintained in step (f) in the range of from about 7.5 to about 8.5.

25. A method as described in claim 24 wherein said zirconium compound is zirconium sulfate.

26. A method as described in claim 25 wherein step (g) includes the step of adjusting the pH of said slurry, following step (e), to a value of about 5.

27. A method as described in claim 23 wherein:
   said zirconium compound is added to said slurry in step (b) in an amount such that said hydrous zirconium oxide precipitate is deposited on said titanium dioxide base in step (c) in an amount, expressed as $ZrO_2$, in the range of from about 0.1% to about 2.5% by weight based on the weight of said titanium dioxide base and
   said aluminum compound is added to said slurry in step (d) in an amount such that said hydrous alumina precipitate is deposited on said layer of hydrous zirconium oxide in step (e) in an amount, expressed as $Al_2O_3$, in the range of from about 3.5% to about 4.0% by weight based on the weight of said titanium dioxide base.

28. A method as described in claim 27 wherein said zirconium compound is added to said slurry in step (b) in an amount such that said hydrous zirconium oxide precipitate is deposited on said titanium dioxide base in step (c) in an amount, expressed as $ZrO_2$, in the range of from about 0.4% to about 0.6% by weight based on the weight of said titanium dioxide base.

29. A method as described in claim 28 wherein: said aluminum compound is sodium aluminate;

the pH of said slurry is maintained in step (f) in the range of from about 7.5 to about 8.5;

said zirconium compound is zirconium sulfate; and the pH of said slurry is maintained in step (c) in the range of from about 7.5 to about 8.5.

30. A pigmentary composite prepared by the method of claim 23.

31. A pigmentary composite prepared by the method of claim 24.

32. A pigmentary composite prepared by the method of claim 25.

33. A pigmentary composite prepared by the method of claim 26.

34. A pigmentary composite prepared by the method of claim 27.

35. A pigmentary composite prepared by the method of claim 28.

36. A pigmentary composite prepared by the method of claim 29.

* * * * *